United States Patent
Dizengof et al.

(10) Patent No.: US 10,015,638 B2
(45) Date of Patent: Jul. 3, 2018

(54) SYSTEM AND METHOD FOR PROVIDING A DESCRIPTIVE LOCATION OF A USER DEVICE

(71) Applicant: Carbyne Ltd., Tel-Aviv (IL)

(72) Inventors: Alex Dizengof, Tel Aviv (IL); Yony Yatsun, Tel Aviv (IL)

(73) Assignee: Carbyne Ltd., Tel-Aviv (IL)

( * ) Notice: Subject to any disclaimer, the term of this patent is extended or adjusted under 35 U.S.C. 154(b) by 0 days.

(21) Appl. No.: 15/663,469

(22) Filed: Jul. 28, 2017

(65) Prior Publication Data

US 2018/0035262 A1   Feb. 1, 2018

Related U.S. Application Data

(60) Provisional application No. 62/367,656, filed on Jul. 28, 2016.

(51) Int. Cl.
  *H04W 24/00* (2009.01)
  *H04W 4/04* (2009.01)
  *H04W 64/00* (2009.01)

(52) U.S. Cl.
  CPC ......... *H04W 4/04* (2013.01); *H04W 64/003* (2013.01)

(58) Field of Classification Search
  CPC ................. H04W 4/04; H04W 64/003
  USPC ................. 455/456.1, 456.3, 456.2
  See application file for complete search history.

(56) References Cited

U.S. PATENT DOCUMENTS

| | | | |
|---|---|---|---|
| 7,852,262 B2 | 12/2010 | Namineni et al. | |
| 8,635,192 B2 | 1/2014 | Klassen et al. | |
| 9,154,917 B2 | 10/2015 | Venkatraman et al. | |
| 9,183,229 B2 | 11/2015 | Klassen et al. | |
| 2011/0237278 A1* | 9/2011 | Cone | H04W 8/16 455/456.2 |
| 2012/0040653 A1* | 2/2012 | Mendis | G01S 5/0252 455/414.2 |
| 2015/0039226 A1 | 2/2015 | Ghose et al. | |
| 2015/0169627 A1 | 6/2015 | Gildfind et al. | |
| 2015/0181549 A1 | 6/2015 | Batada et al. | |
| 2015/0237480 A1 | 8/2015 | Fang et al. | |
| 2015/0341754 A1 | 11/2015 | Gooch | |
| 2016/0103201 A1 | 4/2016 | Lee | |
| 2017/0064667 A1* | 3/2017 | Mycek | H04B 17/318 |

* cited by examiner

*Primary Examiner* — Khai M Nguyen

(57) ABSTRACT

A system and method for providing a descriptive location of a first user device. The method includes: receiving a request to determine an updated descriptive location pointer for the second user device; receiving data associated with the first user device and at least one radio frequency (RF) signal; and determining an updated descriptive location pointer for the second user device based on a unique identifier collected by the first user device, the data associated with the first user device, and the at least one RF signal, wherein the unique identifier is created by the first user device based on data and RF signals received by the first user device during a learning phase, wherein the unique identifier is associated with at least one predetermined descriptive location pointer, wherein the updated descriptive location pointer is determined from among the at least one predetermined descriptive location pointer.

19 Claims, 4 Drawing Sheets

SYSTEM AND METHOD FOR PROVIDING A DESCRIPTIVE LOCATION OF A USER DEVICE

CROSS-REFERENCE TO RELATED APPLICATIONS

This application claims the benefit of U.S. Provisional Application No. 62/367,656 filed on Jul. 28, 2016, the contents of which are hereby incorporated by reference.

TECHNICAL FIELD

The present disclosure relates generally to location tracking, and more specifically to identifying a location of a user device.

BACKGROUND

Due to the number of mobile phones and similar devices in use, particularly in developed countries, users can be connected to the World Wide Web (WWW) from almost anywhere in the globe. Among the advantages that this brings, the ability to locate and identify a specific user's location is one of the most helpful. An example technology used for locating users is the global positioning system (GPS), which can be used to determine a current geographical location of a user device. This location determination may be used for purposes such as, for example, navigation and emergency rescue services. To this end, accurate identification of a user's current location is particularly important.

Specifically, when a person faces an emergency and calls an emergency services phone number, he or she is asked by an emergency dispatcher to provide an address in order to assist the dispatcher in locating the scene of the emergency. However, the address may be unknown to the person, or the person may otherwise be unable to provide the address. In such instances, a GPS on the person's mobile device may be utilized by the dispatcher to locate the person and render emergency aid.

Existing solutions for location identification provide various methods for estimating locations of mobile devices in open and closed environments. Many of these solutions are executed using location pointers of the user's estimated location that are displayed on maps such as, for example, virtual maps, graphical maps, metric maps, and the like. Some indoor positioning systems use preconfigured maps that include visual characteristics of a certain location such as an apartment, a building complex, etc. Other indoor positioning systems generate maps using signals that are transmitted by a user device associated with a user while the user walks through a location.

The existing solutions for location identification can be inaccurate, especially when used for indoor navigation. More specifically, these existing solutions may not be able to precisely determine a location within a building, and may face further challenges in determining altitude/height within a building. Further, existing solutions cannot identify precise indoor locations such as floors, rooms, or addresses within a building (e.g., an apartment number or address). Such precise indoor locations may be critical in densely populated areas, where emergency services cannot efficiently respond without knowing the target location within a building.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing a descriptive location of a first user device. The method comprises: receiving a request to determine an updated descriptive location pointer for the second user device; receiving data associated with the first user device and at least one radio frequency (RF) signal; and determining an updated descriptive location pointer for the second user device based on a unique identifier collected by the first user device, the data associated with the first user device, and the at least one RF signal, wherein the unique identifier is created by the first user device based on data and RF signals received by the first user device during a learning phase, wherein the unique identifier is associated with at least one predetermined descriptive location pointer, wherein the updated descriptive location pointer is determined from among the at least one predetermined descriptive location pointer.

Certain embodiments disclosed herein also include a non-transitory computer readable medium having stored thereon causing a processing circuitry to execute a process for providing a descriptive location of a first user device, the process comprising: receiving a request to determine an updated descriptive location pointer for the second user device; receiving data associated with the first user device and at least one radio frequency (RF) signal; and determining an updated descriptive location pointer for the second user device based on a unique identifier collected by the first user device, the data associated with the first user device, and the at least one RF signal, wherein the unique identifier is created by the first user device based on data and RF signals received by the first user device during a learning phase, wherein the unique identifier is associated with at least one predetermined descriptive location pointer, wherein the updated descriptive location pointer is determined from among the at least one predetermined descriptive location pointer.

Certain embodiments disclosed herein also include a system for providing a descriptive location of a first user device. The system comprises: a processing circuitry; and a memory, the memory containing instructions that, when executed by the processing circuitry, configure the system to: receiving a request to determine an updated descriptive location pointer for the second user device; receiving data associated with the first user device and at least one radio frequency (RF) signal; and determining an updated descriptive location pointer for the second user device based on a unique identifier collected by the first user device, the data associated with the first user device, and the at least one RF signal, wherein the unique identifier is created by the first user device based on data and RF signals received by the first user device during a learning phase, wherein the unique identifier is associated with at least one predetermined descriptive location pointer, wherein the updated descriptive location pointer is determined from among the at least one predetermined descriptive location pointer.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
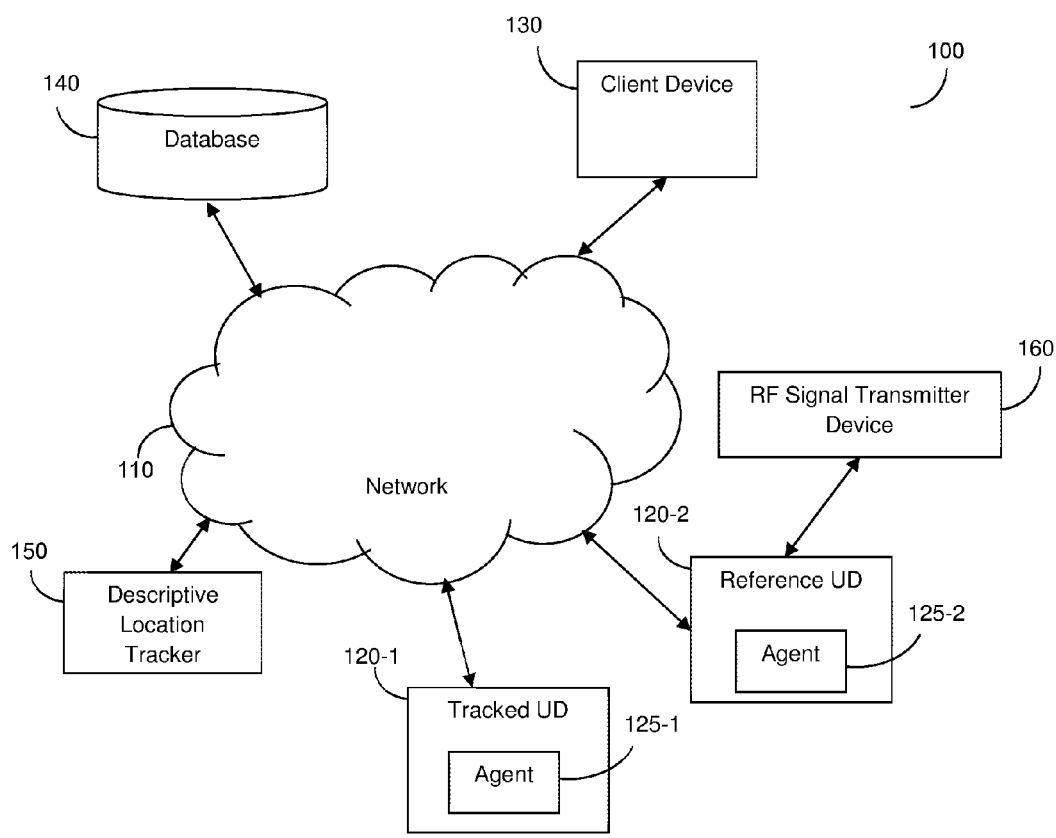
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing a descriptive location. One or more initial descriptive location pointers associated with the tracked UD are received or retrieved. During a learning phase, data associated with the tracked UD and radio frequency (RF) signals from RF signal transmitters are received and analyzed to create unique identifiers for each initial descriptive location pointers. During a tracking phase, when an updated descriptive location pointer is required, RF signals and data associated with the tracked UD are received at a descriptive location tracker from a reference UD. The updated descriptive location pointer is determined based on comparison of the data associated with the tracked UD data of the RF signals received during the tracking phase with the unique identifier.

During the learning phase, data associated with the tracked UD and the RF signals may be received when a trigger event is detected by the tracked UD. To this end, the tracked UD may be configured to analyze data associated with the tracked UD continuously, for example, repeatedly at predetermined time intervals. The time intervals may be sufficiently frequent such that the user's movements are tracked as they occur. For example, a trigger event may be movement of the tracked UD, lack of movement of the tracked UD for a threshold period of time, a connection to a new network, and the like.

The data associated with the tracked UD and of the RF signals received during the learning phase can be continuously analyzed to create the unique identifier for the tracked UD. The continuous analysis may be performed, e.g., repeatedly at predetermined time intervals based on the most recently received data associated with the tracked UD and RF signals, thereby allowing for creation of a unique identifier for each initial descriptive location pointer. For example, if two users of tracked user devices are living in the same house, when entering the initial descriptive location pointer, both will have the same address and therefore the location, for example their apartment, will have the same unique identifier.

In various embodiments, the updated descriptive location pointer may be provided to a client device operated by an entity that utilizes knowledge of the location of the tracked UD. Such a client device may be, for example, a client device operated by an emergency services dispatcher, a server of a social media network, and the like. Thus, the updated descriptive location pointers may be utilized to alert other entities about the precise location of the user for purposes such as rendering emergency aid and informing other social media users of the location of a particular user. In a further embodiment, the updated descriptive location pointers may be collected and aggregated. In yet a further embodiment, the aggregated descriptive location pointers may be utilized to generate and display, on a client device, a descriptive location map indicating the descriptive location pointers of one or more users.

The embodiments disclosed herein allow for more accurate and precise identification of user locations with respect to user devices. In particular, the descriptive location pointers determined as described herein may provide more specific locations than, for example, using global positioning systems alone. More specifically, the descriptive location pointers may indicate user device locations with respect to particular buildings, floors, apartments, rooms, or other relative indoor locations of user devices, whereas solutions such as global positioning systems may provide location pointers that only indicate geographic locations without details related to particular buildings or other indoor locations. Such specific locations may be critical for, e.g., emergency aid personnel needing to know in which rooms, apartments, or floors, are people in need of aid, particularly in more densely populated urban areas. Further, the descriptive location pointers determined as described herein may be more accurate than at least some existing solutions, particularly with respect to altitude.

FIG. 1 shows an example network diagram 100 utilized to describe the various disclosed embodiments. In the example network diagram 100, a tracked user device (UD) 120-1, a reference UD 120-2, a client device 130, a database 140, and a descriptive location tracker 150, are communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

Each of the UDs 120-1 and 120-2 may be, but is not limited to, a personal computer (PC), a personal digital assistant (PDA), a mobile phone, a smart phone, a tablet computer, a wearable computing device and other kinds of wired and mobile appliances, equipped with capabilities that are enabled as further discussed herein below. Each UD 120-1 or 120-2 may have installed thereon an agent 125. The agent 125 may be configured to transmit indoor location pointers, transmit outdoor location pointers, identify radio frequency (RF) signals transmitted by a RF signal transmitter device 160, a combination thereof, and the like.

In an example implementation, the tracked UD 120-1 is a UD for which descriptive location pointers are determined. The tracked UD 120-1 is configured to receive user inputs from a user of the tracked UD 120-1 and to determine, based on the user inputs, one or more initial descriptive location pointers associated with the tracked UD 120-1. For example, the user inputs may indicate the user's home address and the user's office address. As another example, the user inputs may indicate an apartment number on a specific floor of a building.

The tracked UD 120-1 includes a RF signal receiver (not shown) such that the tracked UD 120-1 may be configured to receive RF signals from one or more RF signal transmitter devices including the RF signal transmitter device 160. Further, the agent 125-1 may be configured to only identify RF signals received from a RF signal transmitter device within a threshold signal receiving distance. For example, the agent 125-1 may be configured to only identify RF signals received from a RF signal transmitter within 5 meters from the tracked UD 120-1.

During a learning phase, the tracked UD 120-1 is configured to create a unique identifier for one of the initial descriptive location pointers with respect to the RF signal transmitter device 160 based on data associated with the tracked UD 120-1 and RF signals received by the tracked UD 120-1 from the RF signal transmitter device 160. The RF signals and data associated with the tracked UD 120-1 may be analyzed continuously, or may be analyzed when the tracked UD 120-1 detects a trigger event. The trigger event may be, but is not limited to, lack of movement for a threshold amount of time (e.g., at least 16 hours), connection of the tracked UD 120-1 to an unfamiliar or new Wi-Fi network, a threshold movement (e.g., as indicated by an accelerometer or global positioning system of the UD 120-1), and the like. To this end, the trigger event may be detected based on data from a sensor, service or network adapter of the tracked UD 120-1 such as, for example, an accelerometer, a gyroscope, a global positioning system (GPS), a Wi-Fi adapter, Bluetooth, and the like.

The associated data may indicate for example, movement of the tracked UD 120-1 from the initial descriptive location pointer, lack of movement from the location indicated by the tracked UD location pointer, and the like. To this end, the associated data may include, but is not limited to, a distance traveled by the tracked UD 120-1 (e.g., as indicated by GPS signals), connection of the tracked UD 120-11 to a new Wi-Fi network, an amount of time elapsed since last movement (e.g., an amount of time since one or more sensor signals associated with movement above a threshold was received), and the like.

The client device 130 may be, but is not limited to, a personal computer (PC), a personal digital assistant (PDA), a mobile phone, a smart phone, a tablet computer, a server, and any other device equipped with communication capabilities allowing for receiving descriptive location pointers, and may be further configured with a display for displaying received location pointers. The client device 130 may be operated by an entity requiring accurate knowledge of the location tracked UD 120-1 such as, for example, an emergency services dispatcher communicating with the user of the tracked UD 120-1 to send emergency aid to the user's location. The emergency services dispatcher may be, for example, a police dispatcher, a municipal dispatcher, and the like. Alternatively, the client device 130 may be utilized by a social media platform to identify locations of users of a social media service.

The RF signal transmitter device 160 is an electronic device that includes a RF signal transmitter (not shown) and may be, but is not limited to, a mobile device, a cellular phone, a computer, a router, a smart TV, a Wi-Fi printer, and the like. In some implementations, the RF signal transmitter device 160 may be or may be included in a UD (e.g., the reference UD 120-2). The RF signal transmitter device 160 is associated with one of the initial descriptive location pointers of the tracked UD 120-1.

The database 140 stores the unique identifier and the initial descriptive location pointers. The unique identifier is associated with one of the initial descriptive location pointers determined by the tracked UD 120-1. The unique identifier and associated initial descriptive location pointer may be utilized by the descriptive location tracker 150 to identify the updated descriptive location pointer as described herein.

In an embodiment, the descriptive location tracker 150 is configured to receive, from the agent 125-1 of the tracked UD 120-1, one or more initial descriptive location pointers. Alternatively, the descriptive location tracker 150 may be configured to retrieve the initial descriptive location pointers from the database 140. In another embodiment, the initial descriptive location pointers may be retrieved from a data source (not shown) such as a database, a web source (e.g., a server accessible over the Internet), and the like. The data source may be, for example, a regulatory database storing location pointers of user devices.

In yet another embodiment, the descriptive location tracker 150 is configured to receive each initial descriptive location pointer from an electronic device including an RF signal transmitter (e.g., the RF signal transmitter device 160), such as for example, a router that transmits RF signals), to which the tracked UD 120-1 is communicatively connected. To this end, the electronic device may store the initial descriptive location pointer of the tracked UD 120-1 and, therefore, the user is not required to enter the initial descriptive location pointer to the tracked UD 120-1.

Each initial descriptive location pointer indicates a location associated with the tracked UD 120-1 and may be, but is not limited to, a known descriptive location of the tracked UD 120-1. To this end, each initial descriptive location pointer may be a previously determined descriptive location pointer for the tracked UD 120-1, or may be provided directly by, e.g., the user of the tracked UD 120-1 (e.g., by inputting the initial descriptive location pointer to the agent 125 via a user interface of the tracked UD 120-1). The initial descriptive location pointer may be a descriptive location and may indicate, but is not limited to, a home address, an office address, a street name, a house number, a floor, an apartment number, a room number, a combination thereof, and the like. In an example implementation, the initial descriptive location pointer may be the most specific location of the tracked UD 120-1. For example, the initial descriptive location pointer may indicate a room number on a particular floor of a specific building.

During a tracking phase, the descriptive location tracker 150 is configured to analyze data and RF signals received by the reference UD 120-2, and to compare the results of the analysis to the unique identifier in order to determine an updated descriptive location pointer from among the initial descriptive location pointers. The data and RF signals received by the reference UD 120-2 may be received from a device in proximity to the reference UD 120-2 such as the tracked UD 120-1, the RF signal transmitter device 160, or both. The comparison may be performed when, for example, a request for an updated descriptive location pointer is received via the application 125-2. For example, if a user of the reference device 120-2 finds the user of the tracked UD 120-1 in need of emergency aid but does not know his or her precise location, the reference UD 120-2 may send a request for an updated descriptive location pointer as well as data and RF signals collected at the scene to the descriptive location tracker 150. The descriptive location tracker 150 is configured to match the information indicated in the received data and RF signals to the unique identifier, thereby identifying an updated descriptive location pointer indicating the precise current location of the user of the tracked UD 120-1.

To this end, the descriptive location tracker 150 is configured to determine when an updated descriptive location pointer is required to be sent, e.g., to the client device 130, to the tracked UD 120-1, and the like, and if so, to send the updated descriptive location pointer. The updated descriptive location pointer may be required to be sent when, for example, a request is received from a user (e.g., of the client device 130, of the tracked UD 120-1, or of the reference UD 120-2), based on one or more environmental variables and updated location pointer provision rules, and the like. The request may be, but is not limited to, a request for reporting data, a query for positioning, an application programming interface (API) request, and the like. The updated location pointer provision rules may indicate environmental variables that may require, for example, emergency services, such as immobility of the tracked UD 120-1 for more than 12 hours.

In another example implementation, the descriptive location tracker 150 may be configured to automatically provide updated descriptive location pointers to, e.g., a social media network, thereby allowing for updating location statuses of users automatically. Further, the updated descriptive location pointers may be provided automatically when, for example, the tracked UD 120-1 arrives at a particular location, thereby alerting other users to the arrival of the user of the tracked UD 120-1.

It should be noted that the embodiments described herein above with respect to FIG. 1 are discussed with respect to one tracked user device 120-1 as well as one client device 130 merely for simplicity purposes and without limitation on the disclosed embodiments. Descriptive location pointers of multiple tracked UDs may be determined based on respective unique identifiers created by different tracked UDs during the learning phase, and each updated description location pointer may be sent to one or more client devices, without departing from the scope of the disclosed embodiments. Moreover, the updated descriptive location pointer determined for the reference UD 120-2 may be sent to the reference UD 120-2, thereby allowing the reference UD 120-2 to utilize or cause display of the descriptive location.

It should also be noted that multiple RF signal transmitter devices may be equally utilized as described herein above in order to, for example, transmit RF signals to the tracked UD 120-1 as the tracked UD 120-1 moves among the initial descriptive location pointers provided by the user of the tracked UD 120-1 in order to create a unique identifier that associates each RF signal transmitter device with one of the initial descriptive location pointers provided by the user of the tracked UD 120-1, thereby allowing for uniquely determining the updated descriptive location pointer for the reference UD 120-2 based on data and RF signals collected by the reference UD 120-2 at the location of the tracked UD 120-1, the RF signal transmitter 160, or both.

Figure 2:
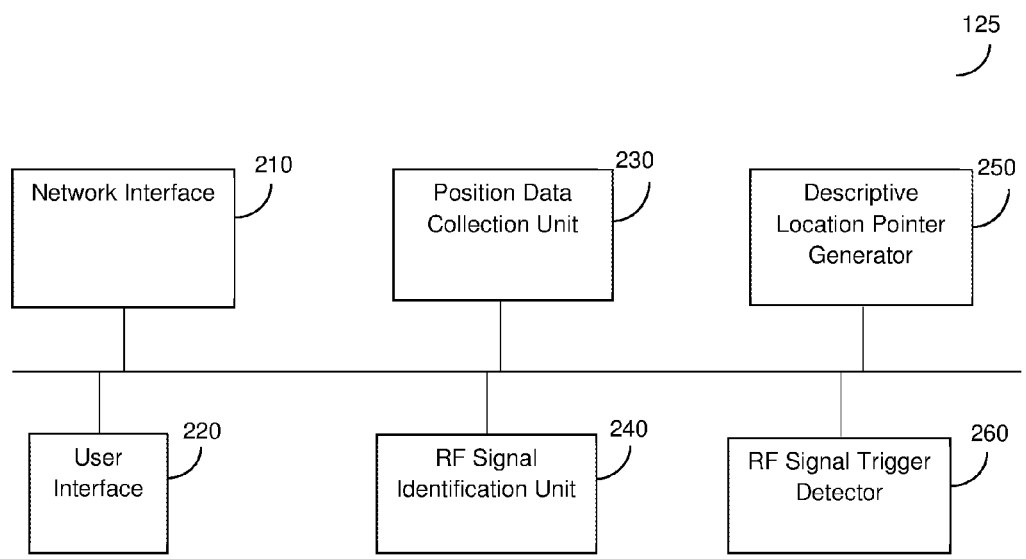
FIG. 2 is a block diagram of an agent configured according to an embodiment.

FIG. 2 is an example schematic diagram of an agent 125 installed on a user device according to an embodiment. In an example implementation, the agent 125 may be the agent 125-1 of the user device 120-1.

The agent 125 includes a network interface 210, a user interface 220, a position data collection unit 230, a radio frequency (RF) signal identification unit 240, a descriptive location pointer generation unit 250, and a RF signal trigger detector 260. The network interface 210 is configured to allow the agent 125 to communicate with the client device 130, the descriptive location tracker 150, or both. The user interface 220 is configured to receive inputs from the user of the tracked UD 120-1 such as, but not limited to, inputs indicating initial descriptive location pointers.

The position data collection unit 230 is configured to collect the data associated with the tracked UD 120-1 from one or more sensors (not shown) or adapters of the tracked UD 120-1. The RF signal identification unit 240 is configured to identify RF signals from RF signal transmitters in proximity to the tracked UD 120-1. The RF signal identification unit 240 may be configured to identify only RF signals received from RF signal transmitters within a threshold distance, e.g., 3 meters.

The descriptive location pointer generator 250 is configured to generate, based on user inputs received via the user interface 220, the initial descriptive location pointer for the tracked UD 120-1. The RF signal trigger detector 260 is configured to detect triggers for beginning RF signal collection. To this end, the RF signal trigger detector 260 is configured to receive signals from sensors, network adapters, or both, of the tracked UD 120-1, and to detect trigger events based on the received signals. To this end, the RF signal trigger detector 260 may include or be communicatively connected to, an accelerometer, a gyroscope, a barometer, a GPS, a Bluetooth adapter, a Wi-Fi adapter, an internal measurement unit (IMU), a combination thereof, and the like. When a trigger event is detected by the RF signal trigger detector 260, the RF signal identification unit 240 is configured to begin identifying RF signals from proximate RF signal transmitters.

Figure 3:
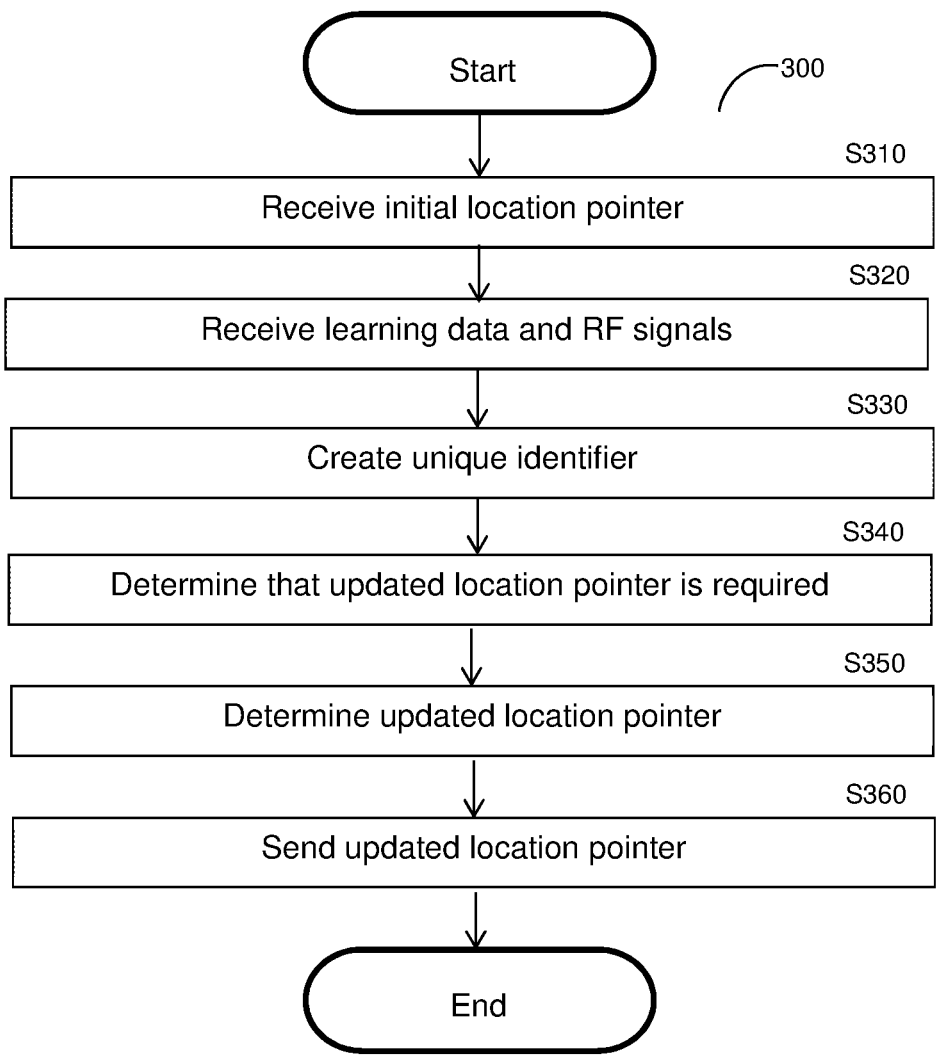
FIG. 3 is a flowchart illustrating a method for providing a descriptive location of a user device according to an embodiment.

FIG. 3 is an example flowchart 300 illustrating a method for providing a descriptive location of a user device. In an embodiment, the method is performed by a server such as the descriptive location tracker 150 to provide a descriptive location of the tracked UD 120-1 to, for example, the tracked UD 120-1 or the client device 130.

At S310, an initial descriptive location pointer is received or retrieved. The initial descriptive location pointer may be received from an agent (e.g., the agent 125) of the tracked UD 120-1, may be retrieved from a database or data source, may be retrieved from an electronic device including an RF signal transmitter (e.g., a router), and the like. The initial descriptive location pointer may be an indoor location pointer indicating a specific indoor location such as, for example, a particular room, floor, building, apartment, address a combination thereof, and the like.

At S320, during a learning phase, data associated with the tracked UD 120-1 and RF signals transmitted by a RF signal transmitter in physical proximity to the tracked UD 120-1 are received by the tracked UD 120-1. The data and RF signals received during the learning phase may be received continuously (e.g., repeatedly at predetermined time intervals), or may be received when a trigger event is detected. The trigger event may be detected, for example, by the agent 125-1 of the tracked UD 120-1. The data associated with the tracked UD 120-1 may include, but is not limited to, GPS signals, connection data, time data, and the like. The RF signal transmitter is in physical proximity to the tracked UD 120-1

At S330, the data associated with the tracked UD 120-1 and RF signals are analyzed by the tracked UD 120-1 to create a unique identifier to be associated with the tracked UD 120-1. The unique identifier is for one of the received initial descriptive location pointers, thereby allowing for determination of an updated descriptive location pointer based on identification of the unique identifier. In an embodiment, S330 further includes sending the created unique identifier and the initial descriptive location pointer to the descriptive location tracker 150.

Determining the location pointer based on a unique identifier associated with a known initial descriptive location pointer allows for providing updated descriptive location pointers that literally describe the precise location of the user, i.e., such that the descriptive location pointer can be readily interpreted by a user.

At S340 it is determined that an updated descriptive location pointer for the reference UD 120-2 is required to be sent by the updated descriptive location tracker 150. The determination may be based on, for example, receipt of a request for the updated descriptive location pointer (e.g., from a client device operated by an emergency services dispatcher requiring the indoor location of the user of the tracked UD 120-1), based on environmental variables related to the tracked UD 120-1 and one or more updated location rules, and the like.

At S350, during a tracking phase, when it is determined that the updated descriptive location pointer is required to be sent, the updated descriptive location pointer is determined by the descriptive location tracker 150. In an embodiment, the determination is based on the unique identifier as well as data and RF signals received by the reference UD 120-2 when the reference UD 120-2 is in proximity (e.g., within a predetermined threshold distance) to the tracked UD 120-1 or the RF signal transmitter 160. To this end, the determination may include comparing the unique identifier to the information indicated in the data and RF signals received by the reference UD 120-2. Determining the updated descriptive location pointer based on a unique identifier associated with a known initial descriptive location pointer allows for more accurate and precise identification of a current location of a device than, for example, using GPS data alone, particularly for indoor locations.

At S360, the updated descriptive location pointer is sent to, for example, the requesting device, or to another device indicated in the request. For example, if the user of the reference UD 120-2 requested the updated descriptive location pointer be sent to a client device via the app 125-2, the updated descriptive location pointer may be sent to the client device. The client device may be, for example, a client device of an emergency dispatch unit that is operated by an emergency services dispatcher to receive reports of emergencies.

Figure 4:
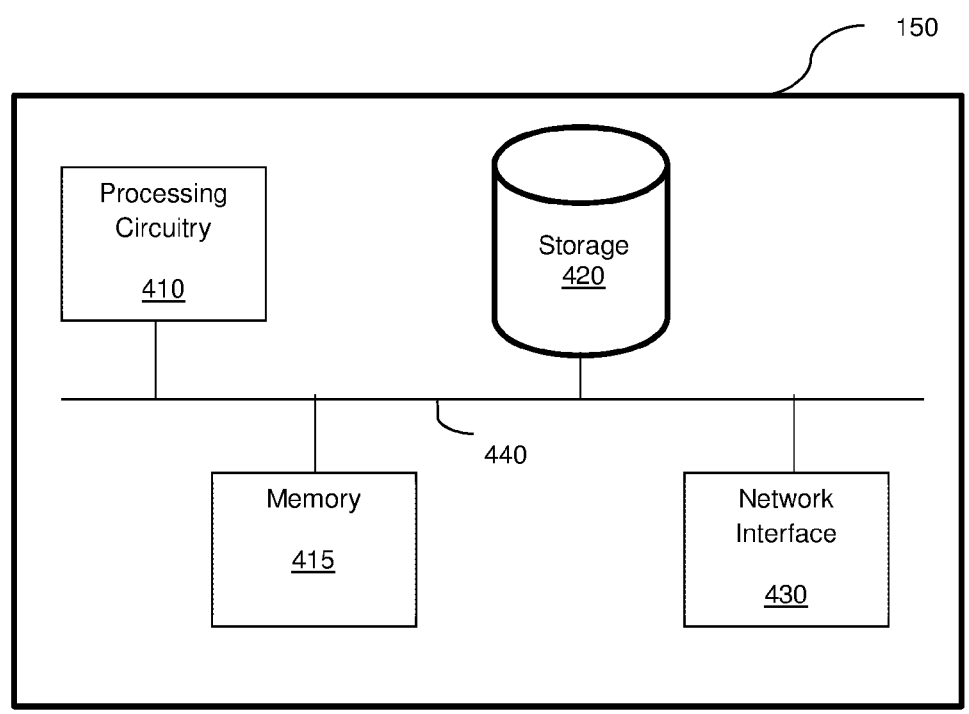
FIG. 4 is a schematic diagram of a location identifier according to an embodiment.

FIG. 4 is an example schematic diagram of a descriptive location tracker 150 according to an embodiment. The descriptive location tracker 150 includes a processing circuitry 410 coupled to a memory 415, a storage 420, and a network interface 430. In an embodiment, the components of the descriptive location tracker 150 may be communicatively connected via a bus 440.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 415 may be volatile (e.g., RAM, etc.), non-volatile (e.g., ROM, flash memory, etc.), or a combination thereof. In one configuration, computer readable instructions to implement one or more embodiments disclosed herein may be stored in the storage 420.

In another embodiment, the memory 415 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein. Specifically, the instructions, when executed, cause the processing circuitry 410 to perform location identification, as discussed herein.

The storage 420 may be magnetic storage, optical storage, and the like, and may be realized, for example, as flash memory or other memory technology, CD-ROM, Digital Versatile Disks (DVDs), or any other medium which can be used to store the desired information.

The network interface 430 allows the descriptive location tracker 150 to communicate with the tracked UD 120-1, the reference UD 120-2, the client device 130, the database 140, or a combination of, for the purpose of, for example, receiving location pointers and related data, receiving RF signals, receiving unique identifiers, sending descriptive location pointers, and the like.

It should be understood that the embodiments described herein are not limited to the specific architecture illustrated in FIG. 4, and other architectures may be equally used without departing from the scope of the disclosed embodiments. For example, the components of the descriptive location tracker 150 may be included in the user device 120-1 or the client device 130 such that the respective device may be configured to perform location identification as described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for determining a descriptive location of a second user device based on data of a first user device, comprising:
    receiving a request to determine an updated descriptive location pointer for the second user device;
    receiving data associated with the first user device and at least one radio frequency (RF) signal; and
    determining an updated descriptive location pointer for the second user device based on a unique identifier collected by the first user device, the data associated with the first user device, and the at least one RF signal, wherein the unique identifier is created by the first user device based on data and RF signals received by the first user device during a learning phase, wherein the unique identifier is associated with at least one predetermined descriptive location pointer, wherein the updated descriptive location pointer is determined from among the at least one predetermined descriptive location pointer.

2. The method of claim 1, wherein the data and RF signals received by the first user device during the learning phase are received when a trigger event is detected.

3. The method of claim 2, wherein the trigger event includes movement of the first user device from a location indicated by a first location pointer, wherein the data received by the first user device indicates a change in location of the first user device that triggered the trigger event.

4. The method of claim 2, wherein the trigger event includes a lack of movement of the first user device for at least a threshold period of time.

5. The method of claim 2, wherein the trigger event includes identification of an updated network connection.

6. The method of claim 1, wherein the at least one predetermined descriptive location pointer is determined based on user inputs received by the first user device.

7. The method of claim 1, wherein the data associated with the first user device and the at least one RF signal are received from the second user device when the second user device is in proximity to at least one of: the first user device, and a RF signal transmitter device that transmitted at least a portion of the at least one RF signal during the learning phase.

8. The method of claim 1, wherein the updated descriptive location pointer is an indoor location pointer.

9. The method of claim 8, wherein the updated descriptive location pointer indicates at least one of: a street name, a street number, a building number, a floor, an apartment number, and a room number.

10. A non-transitory computer readable medium having stored thereon instructions for causing a processing circuitry to execute a process for determining a descriptive location of a second user device based on data of a first user device, the process comprising:
    receiving a request to determine an updated descriptive location pointer for the second user device;
    receiving data associated with the first user device and at least one radio frequency (RF) signal; and
    determining an updated descriptive location pointer for the second user device based on a unique identifier collected by the first user device, the data associated with the first user device, and the at least one RF signal, wherein the unique identifier is created by the first user device based on data and RF signals received by the first user device during a learning phase, wherein the unique identifier is associated with at least one predetermined descriptive location pointer, wherein the updated descriptive location pointer is determined from among the at least one predetermined descriptive location pointer.

11. A system for determining a descriptive location of a second user device based on data of a first user device, comprising:
    a processing circuitry; and
    a memory, the memory containing instructions that, when executed by the processing circuitry, configure the system to:
    receiving a request to determine an updated descriptive location pointer for the second user device;
    receiving data associated with the first user device and at least one radio frequency (RF) signal; and
    determining an updated descriptive location pointer for the second user device based on a unique identifier collected by the first user device, the data associated with the first user device, and the at least one RF signal, wherein the unique identifier is created by the first user device based on data and RF signals received by the first user device during a learning phase, wherein the unique identifier is associated with at least one predetermined descriptive location pointer, wherein the updated descriptive location pointer is determined from among the at least one predetermined descriptive location pointer.

12. The system of claim 11, wherein the data and RF signals received by the first user device during the learning phase are received when a trigger event is detected.

13. The system of claim 12, wherein the trigger event includes movement of the first user device from a location indicated by a first location pointer, wherein the data received by the first user device indicates a change in location of the first user device that triggered the trigger event.

14. The system of claim 12, wherein the trigger event includes a lack of movement of the first user device for at least a threshold period of time.

15. The system of claim 11, wherein the trigger event includes identification of an updated network connection.

16. The system of claim 11, wherein the at least one predetermined descriptive location pointer is determined based on user inputs received by the first user device.

17. The system of claim 11, wherein the data associated with the first user device and the at least one RF signal are received from the second user device when the second user device is in proximity to at least one of: the first user device, and a RF signal transmitter device that transmitted at least a portion of the at least one RF signal during the learning phase.

18. The system of claim 11, wherein the updated descriptive location pointer is an indoor location pointer.

19. The system of claim 18, wherein the updated descriptive location pointer indicates at least one of: a street name, a street number, a building number, a floor, an apartment number, and a room number.

\* \* \* \* \*